United States Patent
Shahid

(10) Patent No.: US 10,132,971 B2
(45) Date of Patent: Nov. 20, 2018

(54) VEHICLE CAMERA WITH MULTIPLE SPECTRAL FILTERS

(71) Applicant: MAGNA ELECTRONICS INC., Auburn Hills, MI (US)

(72) Inventor: Umer Shahid, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 83 days.

(21) Appl. No.: 15/446,219

(22) Filed: Mar. 1, 2017

(65) Prior Publication Data

US 2017/0257546 A1 Sep. 7, 2017

Related U.S. Application Data

(60) Provisional application No. 62/303,545, filed on Mar. 4, 2016.

(51) Int. Cl.
| | |
|---|---|
| *G02B 5/20* | (2006.01) |
| *G02B 7/00* | (2006.01) |
| *H04N 5/225* | (2006.01) |
| *H04N 5/232* | (2006.01) |

(52) U.S. Cl.
CPC ............ *G02B 5/208* (2013.01); *G02B 7/006* (2013.01); *H04N 5/2254* (2013.01); *H04N 5/232* (2013.01)

(58) Field of Classification Search
CPC ...... G02B 5/208; G02B 7/006; H04N 5/2351; H04N 5/238
See application file for complete search history.

(56) References Cited

U.S. PATENT DOCUMENTS

| | | |
|---|---|---|
| 2,632,040 A | 3/1953 | Rabinow |
| 2,827,594 A | 3/1958 | Rabinow |
| 3,141,393 A | 7/1964 | Platt |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan et al. |
| 3,689,695 A | 9/1972 | Rosenfield et al. |
| 3,708,231 A | 1/1973 | Walters |
| 3,746,430 A | 7/1973 | Brean et al. |
| 3,807,832 A | 4/1974 | Castellion |
| 3,811,046 A | 5/1974 | Levick |
| 3,813,540 A | 5/1974 | Albrecht |

(Continued)

*Primary Examiner* — Oleg Asanbayev
(74) *Attorney, Agent, or Firm* — Honigman Miller Schwartz and Cohn, LLP

(57) ABSTRACT

A vision system for a vehicle includes a camera configured to be disposed at a vehicle so as to have a field of view exterior of the vehicle. The camera includes a lens and an imager, and light passing through the lens is received at the imager via an optic path from the lens to the imager. The camera includes at least two spectral filters, each having a respective cutoff wavelength and (i) passing visible light below the respective cutoff wavelength, (ii) attenuating light above the respective cutoff wavelength. A control is operable to move the spectral filters relative to the optic path. The control positions a selected one of the spectral filters in the optic path so that the imager images visible light below the respective cutoff wavelength of the selected spectral filter. An image processor is operable to process image data captured by the camera.

3 Claims, 5 Drawing Sheets

(56) References Cited

U.S. PATENT DOCUMENTS

| | | |
|---|---|---|
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Loper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini et al. |
| 4,200,361 A | 4/1980 | Malvano et al. |
| 4,214,266 A | 7/1980 | Myers |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai et al. |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer et al. |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer et al. |
| 4,549,208 A | 10/1985 | Kamejima et al. |
| 4,571,082 A | 2/1986 | Downs |
| 4,572,619 A | 2/1986 | Reininger et al. |
| 4,580,875 A | 4/1986 | Bechtel et al. |
| 4,603,946 A | 8/1986 | Kato et al. |
| 4,614,415 A | 9/1986 | Hyatt |
| 4,620,141 A | 10/1986 | McCumber et al. |
| 4,623,222 A | 11/1986 | Itoh et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,647,161 A | 3/1987 | Muller |
| 4,653,316 A | 3/1987 | Fukuhara |
| 4,669,825 A | 6/1987 | Itoh et al. |
| 4,669,826 A | 6/1987 | Itoh et al. |
| 4,671,615 A | 6/1987 | Fukada et al. |
| 4,672,457 A | 6/1987 | Hyatt |
| 4,676,601 A | 6/1987 | Itoh et al. |
| 4,690,508 A | 9/1987 | Jacob |
| 4,692,798 A | 9/1987 | Seko et al. |
| 4,697,883 A | 10/1987 | Suzuki et al. |
| 4,701,022 A | 10/1987 | Jacob |
| 4,713,685 A | 12/1987 | Nlishimura et al. |
| 4,727,290 A | 2/1988 | Smith et al. |
| 4,731,669 A | 3/1988 | Hayashi et al. |
| 4,741,603 A | 5/1988 | Miyagi et al. |
| 4,768,135 A | 8/1988 | Kretschmer et al. |
| 4,789,904 A | 12/1988 | Peterson |
| 4,793,690 A | 12/1988 | Gahan et al. |
| 4,817,948 A | 4/1989 | Simonelli |
| 4,820,933 A | 4/1989 | Hong et al. |
| 4,825,232 A | 4/1989 | Howdle |
| 4,838,650 A | 6/1989 | Stewart et al. |
| 4,847,772 A | 7/1989 | Michalopoulos et al. |
| 4,862,037 A | 8/1989 | Farber et al. |
| 4,867,561 A | 9/1989 | Fujii et al. |
| 4,872,051 A | 10/1989 | Dye |
| 4,881,019 A | 11/1989 | Shiraishi et al. |
| 4,886,960 A | 12/1989 | Molyneux et al. |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,910,591 A | 3/1990 | Petrossian et al. |
| 4,917,477 A | 4/1990 | Bechtel et al. |
| 4,937,796 A | 6/1990 | Tendler |
| 4,956,591 A | 9/1990 | Schierbeek et al. |
| 4,961,625 A | 10/1990 | Wood et al. |
| 4,967,319 A | 10/1990 | Seko |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi |
| 5,124,549 A | 6/1992 | Michaels et al. |
| 5,148,014 A | 9/1992 | Lynam et al. |
| 5,168,378 A | 12/1992 | Black |
| 5,170,374 A | 12/1992 | Shimohigashi et al. |
| 5,172,235 A | 12/1992 | Wilm et al. |
| 5,182,502 A | 1/1993 | Slotkowski et al. |
| 5,184,956 A | 2/1993 | Langlais et al. |
| 5,193,029 A | 3/1993 | Schofield et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,318 A | 5/1995 | Hegyi |
| 5,424,952 A | 6/1995 | Asayama |
| 5,426,294 A | 6/1995 | Kobayashi et al. |
| 5,430,431 A | 7/1995 | Nelson |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,510,983 A | 4/1996 | Lino |
| 5,515,448 A | 5/1996 | Nishitani |
| 5,528,698 A | 6/1996 | Kamei et al. |
| 5,529,138 A | 6/1996 | Shaw et al. |
| 5,530,420 A | 6/1996 | Tsuchiya et al. |
| 5,530,771 A | 6/1996 | Maekawa |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |

(56) References Cited

U.S. PATENT DOCUMENTS

| | | |
|---|---|---|
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,614,788 A | 3/1997 | Mullins |
| 5,627,586 A | 5/1997 | Yamasaki |
| 5,634,709 A | 6/1997 | Iwama |
| 5,638,116 A | 6/1997 | Shimoura et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,670,935 A | 9/1997 | Schofield et al. |
| 5,675,489 A | 10/1997 | Pomerleau |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,837,994 A | 11/1998 | Stam et al. |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,897 A | 3/1999 | Schofield et al. |
| 5,883,739 A | 3/1999 | Ashihara et al. |
| 5,890,021 A | 3/1999 | Onoda |
| 5,896,085 A | 4/1999 | Mori et al. |
| 5,923,027 A | 7/1999 | Stam et al. |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,990,469 A | 11/1999 | Bechtel et al. |
| 3,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,024 A | 8/2000 | Stam et al. |
| 6,124,886 A | 9/2000 | DeLine et al. |
| 6,144,022 A | 11/2000 | Tenenbaum et al. |
| 6,172,613 B1 | 1/2001 | DeLine et al. |
| 6,201,642 B1 | 3/2001 | Bos |
| 6,222,447 B1 | 4/2001 | Schofield et al. |
| 6,243,003 B1 | 6/2001 | DeLine et al. |
| 6,278,377 B1 | 8/2001 | DeLine et al. |
| 6,302,545 B1 | 10/2001 | Schofield et al. |
| 6,326,613 B1 | 12/2001 | Heslin et al. |
| 6,353,392 B1 | 3/2002 | Schofield et al. |
| 6,396,397 B1 | 5/2002 | Bos et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,426,492 B1 | 7/2002 | Bos et al. |
| 6,433,676 B2 | 8/2002 | DeLine et al. |
| 6,442,465 B2 | 8/2002 | Breed et al. |
| 6,445,287 B1 | 9/2002 | Schofield et al. |
| 6,498,620 B2 | 12/2002 | Schofield et al. |
| 6,523,964 B2 | 2/2003 | Schofield et al. |
| 6,553,130 B1 | 4/2003 | Lemelson et al. |
| 6,559,435 B2 | 5/2003 | Schofield et al. |
| 6,611,202 B2 | 8/2003 | Schofield et al. |
| 6,636,258 B2 | 10/2003 | Strumolo |
| 6,672,731 B2 | 1/2004 | Schnell et al. |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,824,281 B2 | 11/2004 | Schofield et al. |
| 6,882,287 B2 | 4/2005 | Schofield |
| 6,891,563 B2 | 5/2005 | Schofield et al. |
| 6,946,978 B2 | 9/2005 | Schofield |
| 6,953,253 B2 | 10/2005 | Schofield et al. |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,123,168 B2 | 10/2006 | Schofield |
| 7,145,519 B2 | 12/2006 | Takahashi et al. |
| 7,161,616 B1 | 1/2007 | Okamoto et al. |
| 7,184,190 B2 | 2/2007 | McCabe et al. |
| 7,227,459 B2 | 6/2007 | Bos et al. |
| 7,230,640 B2 | 6/2007 | Regensburger et al. |
| 7,248,283 B2 | 7/2007 | Takagi et al. |
| 7,255,451 B2 | 8/2007 | McCabe et al. |
| 7,274,501 B2 | 9/2007 | McCabe et al. |
| 7,295,229 B2 | 11/2007 | Kumata et al. |
| 7,301,466 B2 | 11/2007 | Asai |
| 7,480,149 B2 | 1/2009 | DeWard et al. |
| 7,592,928 B2 | 9/2009 | Chinomi et al. |
| 7,626,749 B2 | 12/2009 | Baur et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 7,994,462 B2 | 8/2011 | Schofield et al. |
| 8,256,821 B2 | 9/2012 | Lawlor et al. |
| 8,630,037 B1 | 1/2014 | Osterman et al. |
| 9,126,525 B2 | 9/2015 | Lynam et al. |
| 2002/0015153 A1 | 2/2002 | Downs |
| 2002/0126875 A1 | 9/2002 | Naoi et al. |
| 2004/0114381 A1 | 6/2004 | Salmeen et al. |
| 2005/0219852 A1 | 10/2005 | Stam et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2007/0092245 A1 | 4/2007 | Bazakos et al. |
| 2008/0046150 A1* | 2/2008 | Breed ............... B60R 21/0134 701/45 |
| 2011/0149152 A1 | 6/2011 | Yamamura et al. |
| 2011/0199482 A1* | 8/2011 | Morgan ............ H04N 5/2251 348/143 |
| 2012/0218412 A1 | 8/2012 | Dellantoni et al. |
| 2013/0182756 A1 | 7/2013 | Furlan |
| 2013/0222593 A1 | 8/2013 | Byrne et al. |
| 2014/0055661 A1* | 2/2014 | Imamura ............ A61B 5/441 348/342 |
| 2014/0160284 A1 | 6/2014 | Achenbach et al. |
| 2014/0218529 A1 | 8/2014 | Mahmoud et al. |
| 2014/0218535 A1 | 8/2014 | Ihlenburg et al. |
| 2014/0313339 A1 | 10/2014 | Diessner |
| 2015/0015713 A1 | 1/2015 | Wang et al. |
| 2015/0120092 A1* | 4/2015 | Renno ............... B64D 15/20 701/3 |
| 2015/0120093 A1* | 4/2015 | Renno ............. G01N 21/3554 701/3 |
| 2015/0124098 A1 | 5/2015 | Winden et al. |
| 2015/0229819 A1 | 8/2015 | Rivard et al. |
| 2015/0327398 A1 | 11/2015 | Achenbach et al. |
| 2016/0119527 A1 | 4/2016 | Shahid et al. |
| 2016/0162747 A1 | 6/2016 | Singh et al. |
| 2016/0309098 A1 | 10/2016 | Montandon et al. |
| 2016/0325681 A1 | 11/2016 | Van Dan Elzen |
| 2016/0339959 A1 | 11/2016 | Lee |
| 2017/0083774 A1 | 3/2017 | Solar et al. |

(56) References Cited

U.S. PATENT DOCUMENTS

2017/0113613 A1    4/2017    Van Dan Elzen et al.
2017/0257546 A1    9/2017    Shahid

* cited by examiner

VEHICLE CAMERA WITH MULTIPLE SPECTRAL FILTERS

CROSS REFERENCE TO RELATED APPLICATION

The present application claims the filing benefits of U.S. provisional application Ser. No. 62/303,545, filed Mar. 4, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle. The vision system may be also operable to display objects such as animals and/or pedestrians far away in front of the vehicle for viewing by the driver to mitigate or avoid collision.

The vision system of the present invention includes a camera having at least two spectral filters that, when selectively positioned in or at an optic path between the lens and imager of the camera, function to spectrally filter near infrared light at the imager while passing visible light and a selected range or spectral band of infrared light or near infrared light. Thus, during daytime lighting conditions (or brighter or higher ambient lighting conditions, such as lighting conditions above, for example, about 100 lux or above, for example, about 200 lux), a lower cutoff spectral filter may be used so that the camera can capture enhanced color, and in low lighting conditions (such as at dusk or nighttime lighting conditions, such as lighting conditions below, for example, about 100 lux or below, for example, about 200 lux), a higher IR cutoff spectral filter may be used so that the camera can capture enhanced nighttime images.

Thus, the present invention provides a camera that can adjust its spectral filtering capabilities for the particular lighting conditions that the camera is exposed to. The selection of a particular spectral filter is made by a control that processes image data captured by the camera, whereby the control determines the lighting characteristics and selects a spectral filter that provides enhanced color imaging or enhanced nighttime imaging or the like, depending on the particular lighting conditions at the camera and depending on the particular application of the camera at the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle. Optionally, the vision system may have a camera that is mounted behind the windshield and facing forward and that may provide viewing of and detection of objects such as animals and/or pedestrians far away in front of the subject vehicle in the predicted driving path of the subject vehicle. Optionally, the vision system may provide images of objects inside the subject vehicle to view or detect the driver and/or passenger of the vehicle so as to track driver or passenger facial or hand gestures, or body or eye movement.

Figure 1:
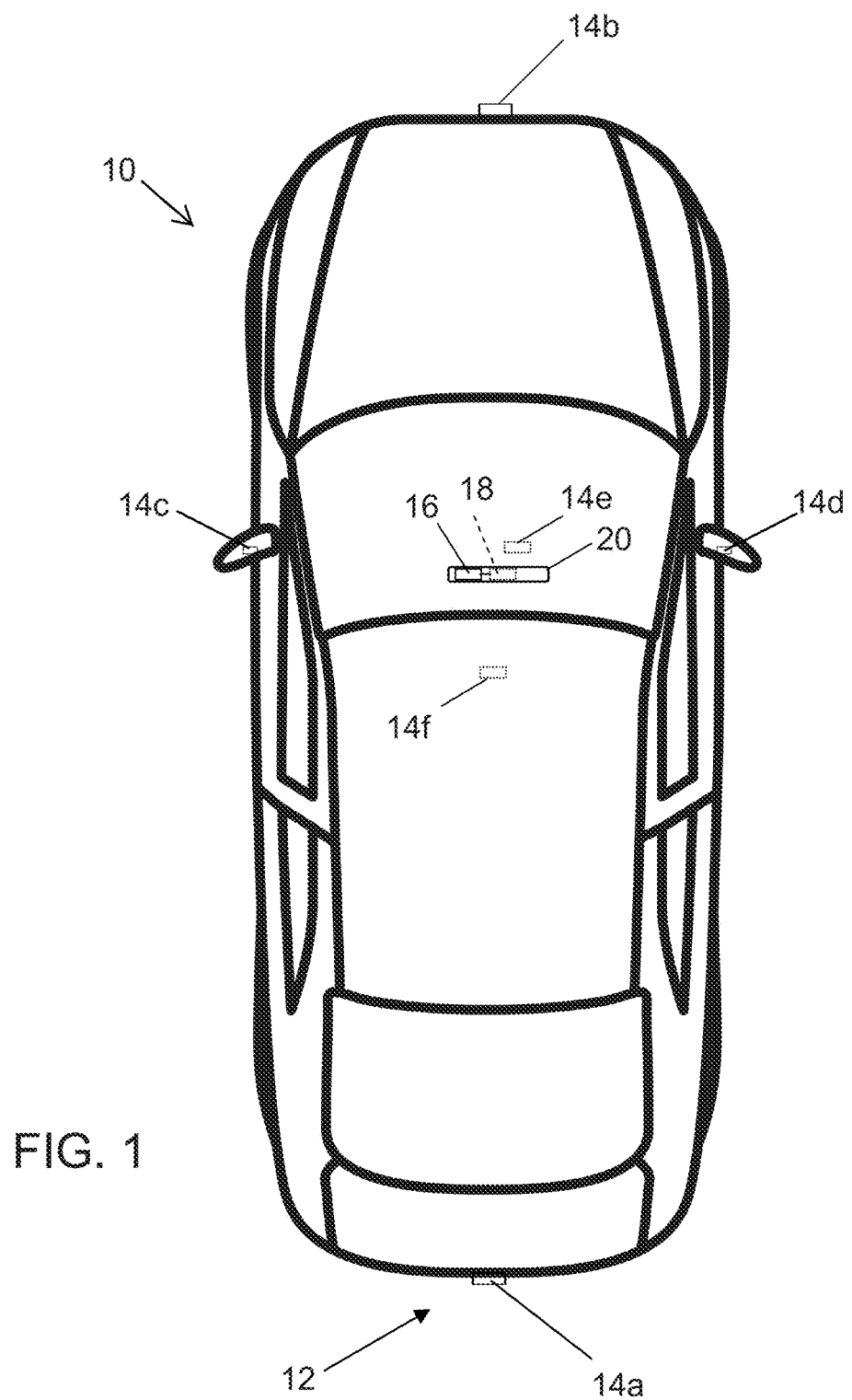
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or a camera 14e at the windshield and viewing through the windshield) of the vehicle, and a sideward/rearward facing camera 14c, 14d at respective sides of the vehicle), which captures images exterior of the vehicle, or an inward facing camera 14f, with the camera or each of the cameras having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a NTSC analog link, a LVDS digital link, an Ethernet digital link, a vehicle network bus or the like of the equipped vehicle.

Figure 2:
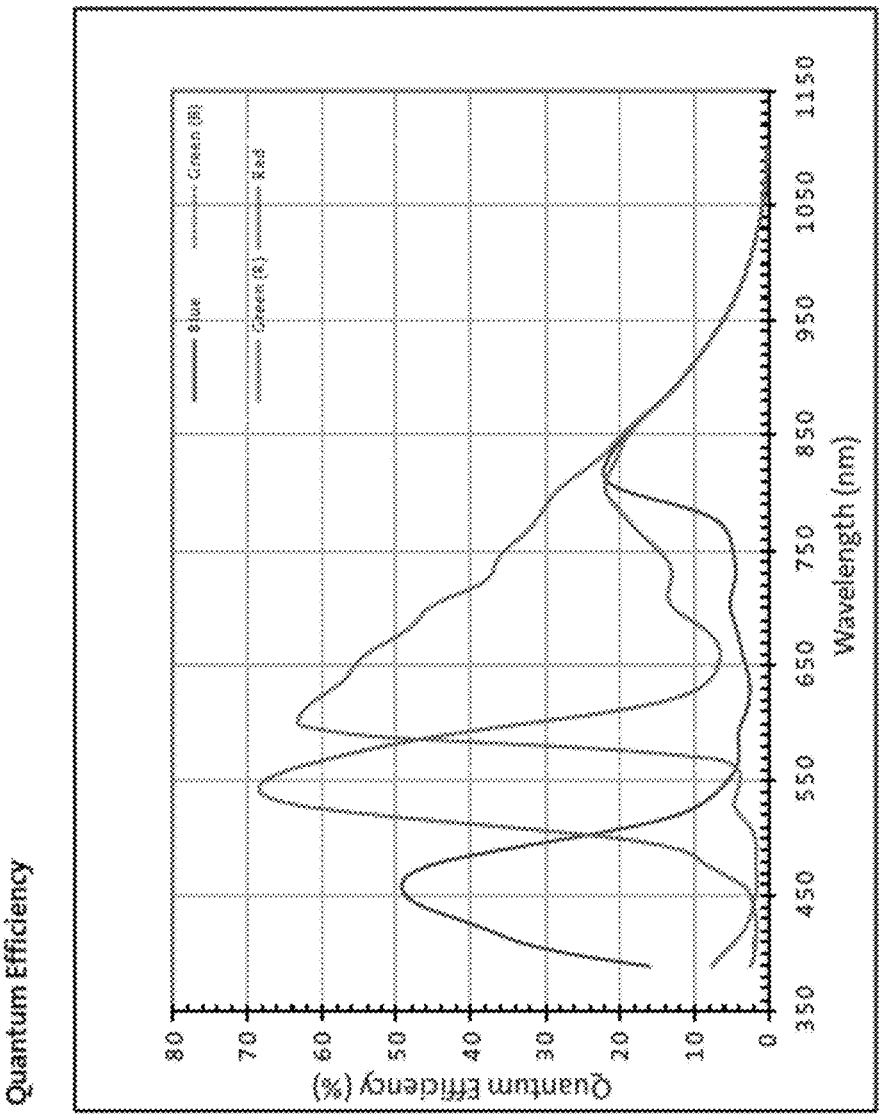
FIG. 2 is a graph showing the spectrum response curve of a typical CMOS imaging sensor.
Figure 3:
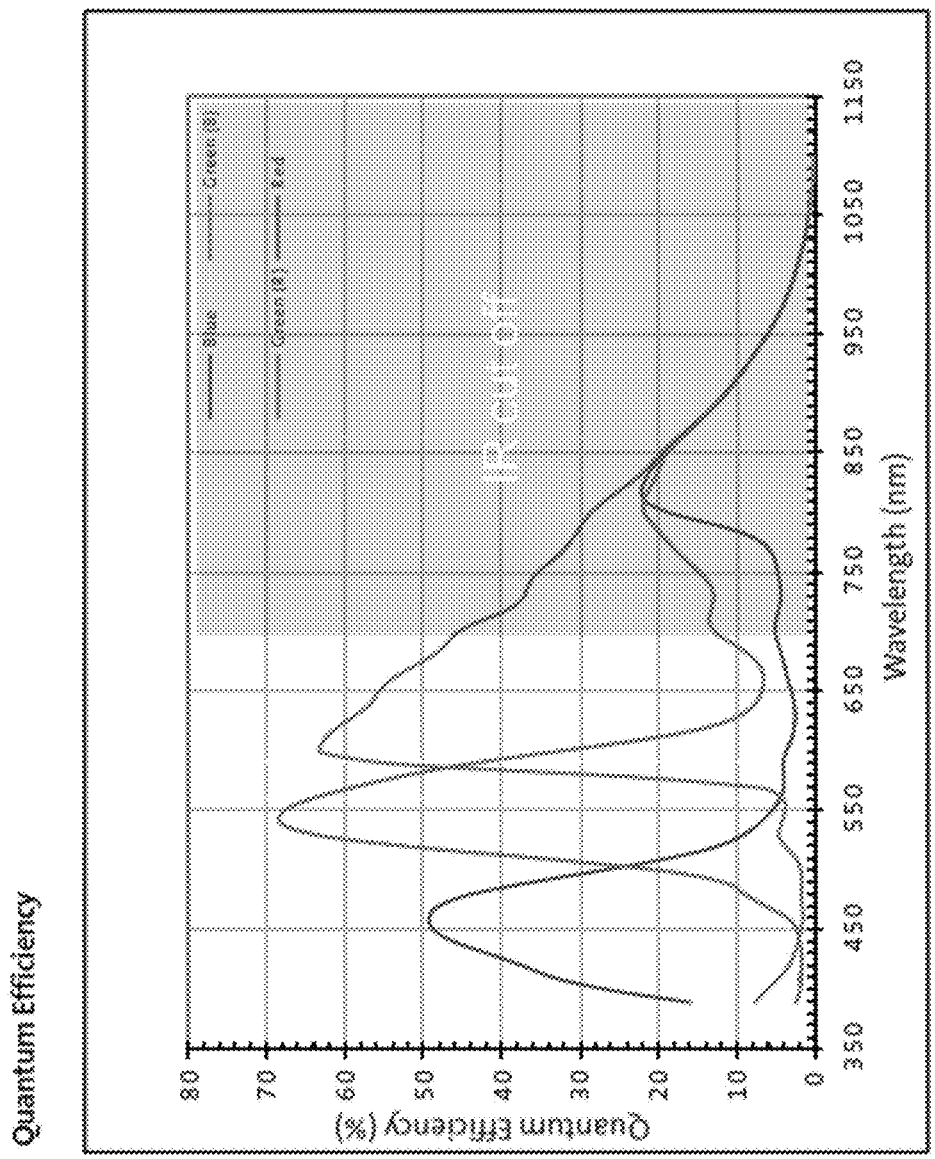
FIG. 3 is another graph of the spectrum response curve of FIG. 2, showing the range of wavelengths that are attenuated by an IR cut-off filter.

As shown in FIG. 2, Silicon-based imaging sensors (such as a CMOS imaging array comprising a plurality of photosensing elements established on a semiconductor substrate) are typically sensitive up to around 1125 nm wavelength (above the visible spectrum range). Human perception is limited to the visible spectrum ranging between wavelengths of about 380 nm and about 780 nm. The ambient light at the camera or imaged by the camera typically includes near infrared (NIR) light or signals, which cause color reproduction issues and reduce image contrast in captured images. In order to match human visual perception, the NIR part of the radiation incident on the cameras is usually blocked or filtered by an IR cut-off filter (FIG. 3).

Typically, for visible range cameras, the IR is blocked anywhere from 640 nm-700 nm. If a 640 nm spectral filter is used, the camera provides enhanced color reproduction for daytime lighting conditions (such as greater than about 200 lux), but has poor performance in lower lighting conditions (such as less than about 200 lux or less than about 100 lux or less than about 3 lux at night), since the filter limits the number of photons reaching the sensor by cutting the IR filter short. If a 710 nm IR cut spectral filter is used, it will allow more photons to reach the sensor, which provides enhanced low light sensing but at the cost of poor color reproduction in low color temperatures (such as around 3,000 K or less). Thus, the particular spectral filter used at the camera lens limits the image quality due to the single IR filter in the imaging system.

Figure 4:
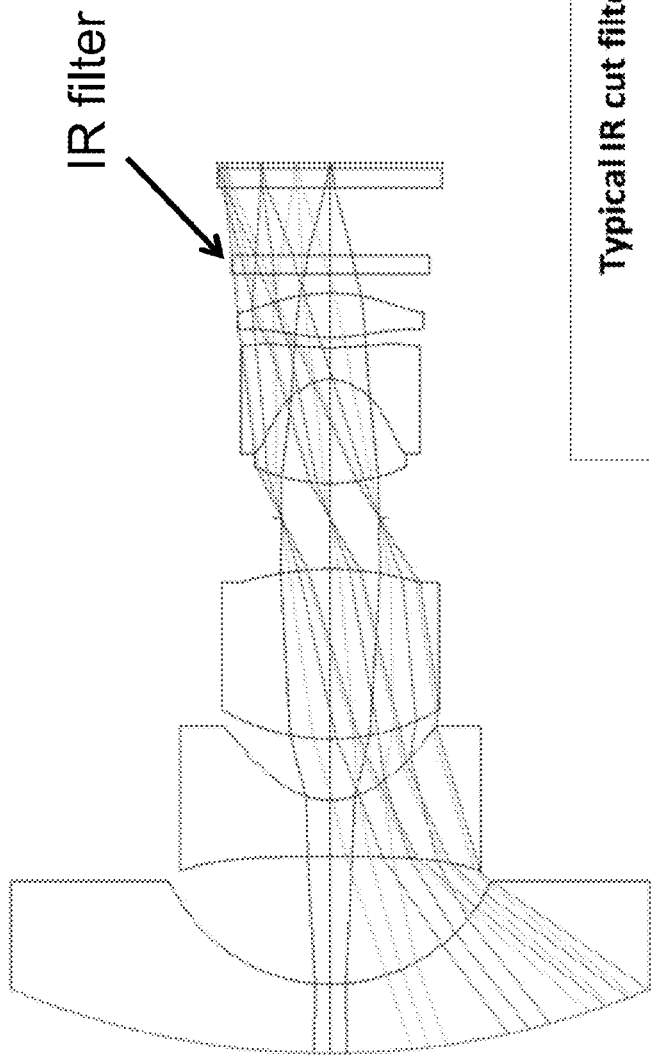
FIG. 4 is a side view of a lens assembly and IR filter configuration suitable for use in the vision system of the present invention.
Figure 5:
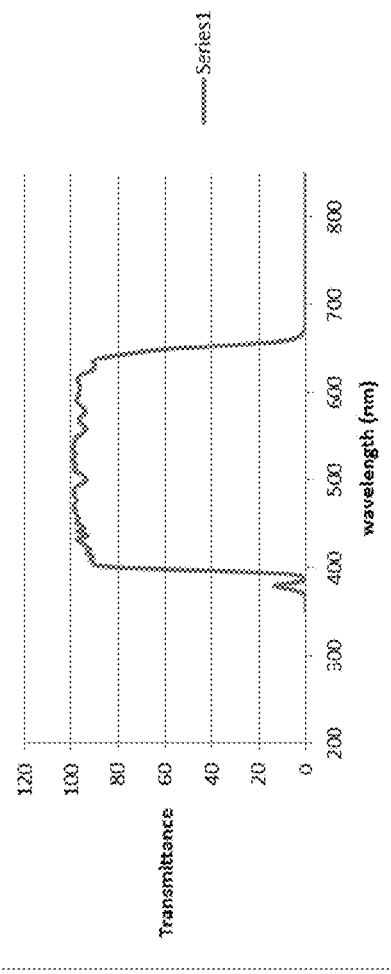
FIG. 5 is a graph showing the spectral bands passed and attenuated by the IR filter of FIG. 4.

The present invention provides multiple IR filters (two or more filters) at the lens of the camera and selectively individually positionable at the lens for spectrally filtering a particular spectral band. For example, the spectral filters may be selected that have a cutoff at 640 nm, 650 nm, 680 nm and 710 nm, so that they substantially pass light in the spectral band below the respective cutoff level and substantially attenuate or block light in the spectral band or range above the respective cutoff level. An example lens and single or selected IR filter is shown in FIG. 4, with an example filter having a cutoff level of around 650 nm, as shown in the graph of FIG. 5.

Figure 6:
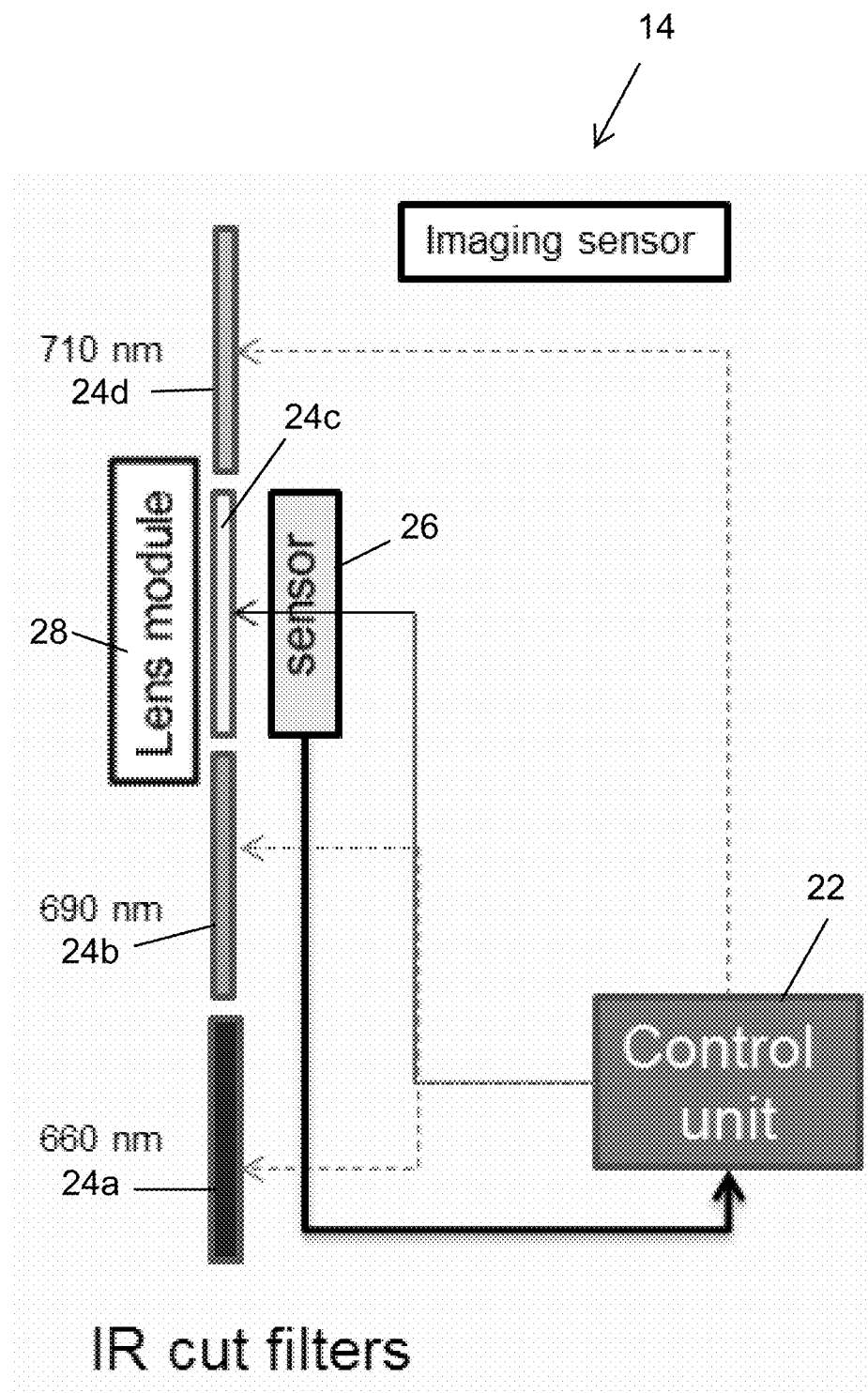
FIG. 6 is a block diagram showing the camera and multiple filter and control system of the present invention.

The multiple spectral filter arrangement of the present invention provides for positioning of a selected or appropriate IR cutoff filter at or behind the lens of the camera and in the optic path of light from the lens to the imager to provide enhanced imaging by the camera for the particular lighting conditions at the scene being viewed by the camera. As shown in FIG. 6, the camera 14 of the present invention includes a control unit 22 that, based on the current lighting condition of the scene (such as the color temperature and illuminance of the scene), determines an appropriate cutoff level or spectral filter 24a-d for the particular lighting condition and selects the best IR cut filter for the lighting condition (to optimize color imaging or to optimize low light imaging).

The control unit receives scene statistics (illuminance, color temperature) from the imaging sensor and, responsive to processing data captured by the image sensor, determines the lighting condition (taking into account the particular filter that is presently in use at the camera) and determines an appropriate spectral filter for the particular lighting condition. Responsive to such determinations, the control unit may change the spectral filter to another spectral filter (or may leave the already in use spectral filter at the imager). The IR filters 24a-d are movably positioned at the camera and at or between the imager 26 and lens or lens module 28. The spectral filters may be movably positioned at any suitable movable support. For example, the spectral filters may be mounted on a rotary stage or a linear stage or may be automatically switched through some other electro-mechanical mechanism. The control, responsive of a determination of the appropriate spectral filter (such as responsive to the determined lighting condition or such as responsive to a particular function that the camera is being used for at that time, such as for headlamp control or object detection or video capture or the like), indexes of moves or adjusts the filter platform or stage or support so that the selected spectral filter is disposed at or in the optical path to the imager or imaging array sensor of the camera.

Therefore, the present invention provides a scene-statistics-based selectable IR cutoff filter for digital imaging systems so as to provide enhanced or optimum color reproduction, contrast enhancement and low light performance. Optionally, the control may determine the appropriate spectral filter based on processing of captured image data by the camera, or the control may use the appropriate spectral filter responsive to a signal from a central control or control of another camera of the vehicle, whereby many or all of the cameras of the vehicle may be similarly controlled to use the same filter (which may save processing power since then only one camera may need the processing capabilities for determining the filter). Optionally, the selection of the spectral filter may be made or overridden via a user input, such as for situations where the user wants to adjust the captured image for display at the display screen of the vehicle. Optionally, one of the spectral filters may have a substantially higher cutoff level, whereby it may be used in substantially low lighting conditions and optionally with use of an infrared or IR light source (that may be actuated when that spectral filter is selected or used to illuminate the scene in the field of view of the camera with infrared or near infrared illumination) or the like. The camera system of the present invention may utilize aspects of the camera systems described in U.S. Publication No. US-2016-0119527 and/or U.S. patent application Ser. No. 15/334,364, filed Oct. 26, 2016, which are hereby incorporated herein by reference in their entireties.

The spectral filters of the camera of the vision system of the present invention may each comprise any suitable spectral filter that passes certain wavelengths or spectral bands of light, while blocking or attenuating other wavelengths or spectral bands of light. For example, the spectral filter may comprise a coating or coatings (such as multiple layers of coatings at selected thicknesses and materials so that the combination of coatings results in the selected attenuation function) at a surface or surfaces of an optic of the camera lens or the cover glass of the imager (and the filter may utilize aspects of the coatings and filters described in U.S. Pat. Nos. 7,626,749; 7,255,451; 7,274,501; 7,184,190 and/or 6,426,492, which are hereby incorporated herein by reference in their entireties). Such an IR filter coating on the lens or the cover glass of the imager passes or transmits the selected range of light to the imager, where the color imager images the visible light that is passed and focused by the lens. The coating may be applied to a lens of a camera that uses a known CMOS imager. The coatings are provided at the lens to provide the desired or selected range of wavelengths to pass through the lens to the imager, where the color imager (having its own color filters established thereat) can capture color images during daytime and night vision images during nighttime.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCCC (red, clear, clear, clear) filter or the like, where the filter elements filter light at the individual photosensor elements. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication Nos. US-2010-0020170 and/or US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:

a camera configured to be disposed at a vehicle so as to have a field of view exterior of the vehicle;

wherein said camera comprises a lens and an imager and wherein light passing through said lens is received at said imager via an optic path from said lens to said imager;

wherein said imager comprises a pixelated imaging array having a plurality of photosensing elements;

wherein, responsive to processing by said image processor of image data captured by said camera, said control determines a lighting condition at said camera;

wherein said camera comprises at least two spectral filters, wherein each of said spectral filters has a respective cutoff wavelength and (i) passes visible light below the respective cutoff wavelength, and (ii) attenuates light above the respective cutoff wavelength;

a control, wherein said control is operable to move said spectral filters relative to the optic path such that a selected spectral filter is positioned in the optic path during operation of said camera;

wherein said control moves said at least two spectral filters via one of (i) linear movement of a row of spectral filters and (ii) rotational movement of spectral filters arranged on a rotary support;

wherein said control positions the selected spectral filter of said at least two spectral filters in the optic path so that said imager images visible light below the respective cutoff wavelength of the selected spectral filter;

wherein a first spectral filter of said at least two spectral filters has a first cutoff wavelength that is shorter than a second cutoff wavelength of a second spectral filter of said at least two spectral filters;

wherein said control is operable to position said first spectral filter in the optic path responsive to a determination of a brighter lighting condition at said camera, and wherein said control is operable to position said second spectral filter in the optic path responsive to a determination of a lower lighting condition at said camera;

wherein said control positions said first spectral filter in the optic path responsive to determination of ambient light of greater than 100 lux, and wherein said control positions said second spectral filter in the optic path responsive to determination of ambient light of less than 100 lux;

an image processor operable to process image data captured by said camera; and wherein said control is operable to move the selected one of said at least two spectral filters to be in the optic path and to move the unselected one of said at least two spectral filters to be out of the optic path.

2. The vision system of claim 1, wherein said at least two spectral filters further comprise a third spectral filter having a cutoff at a third wavelength of light that is longer than said second wavelength of light.

3. The vision system of claim 1, wherein said cutoff of said first spectral filter is at a wavelength of less than 700 nm and said cutoff of said second spectral filter is at a wavelength of greater than 700 nm.

* * * * *